(12) United States Patent
Mukherjee

(10) Patent No.: US 11,381,604 B2
(45) Date of Patent: Jul. 5, 2022

(54) RESILIENT SELF-DETECTION OF MALICIOUS EXFILTRATION OF SENSITIVE DATA

(71) Applicant: Bank of America Corporation, Charlotte, NC (US)

(72) Inventor: Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 186 days.

(21) Appl. No.: 16/983,418

(22) Filed: Aug. 3, 2020

(65) Prior Publication Data
US 2022/0038500 A1 Feb. 3, 2022

(51) Int. Cl.
*H04L 29/06* (2006.01)
*H04L 9/40* (2022.01)

(52) U.S. Cl.
CPC .............. *H04L 63/20* (2013.01); *H04L 63/10* (2013.01); *H04L 63/123* (2013.01)

(58) Field of Classification Search
CPC ....... H04L 63/20; H04L 63/10; H04L 63/123; H04L 63/145; H04L 63/107; H04L 63/0884
USPC .......................................................... 726/23
See application file for complete search history.

(56) References Cited

U.S. PATENT DOCUMENTS

| | | | |
|---|---|---|---|
| 8,533,465 | B2 | 9/2013 | Trestle |
| 8,782,796 | B2 | 7/2014 | Hawthorn et al. |
| 9,483,646 | B2 | 11/2016 | Eren et al. |
| 10,091,222 | B1 | 10/2018 | Langton et al. |
| 10,230,760 | B2 | 3/2019 | Thakar et al. |
| 10,271,165 | B2 * | 4/2019 | Skaaksrud ............ H04W 36/30 |
| 10,313,117 | B1 | 6/2019 | Carlough et al. |
| 10,326,778 | B2 | 6/2019 | Gong et al. |
| 10,462,111 | B2 | 10/2019 | Frankel et al. |
| 10,462,116 | B1 | 10/2019 | Sharifi Mehr et al. |
| 10,587,597 | B1 | 3/2020 | Seidenberg et al. |
| 10,609,001 | B2 | 3/2020 | Mukhopadhyay |
| 10,673,870 | B2 | 6/2020 | Pierce |
| 10,673,880 | B1 | 6/2020 | Pratt et al. |
| 10,681,078 | B2 | 6/2020 | Humphries et al. |
| 10,686,831 | B2 | 6/2020 | Anderson et al. |
| 10,693,898 | B2 | 6/2020 | Iliofotou et al. |
| 10,706,063 | B2 | 7/2020 | Crabtree et al. |
| 10,715,552 | B2 | 7/2020 | Tsironis |

(Continued)

*Primary Examiner* — Longbit Chai
(74) *Attorney, Agent, or Firm* — Banner & Witcoff, Ltd.

(57) ABSTRACT

Aspects of the disclosure relate to exfiltrated data detection. A computing platform may receive secure enterprise data from an enterprise data management platform. In response to receiving the secure enterprise data, the computing platform may generate data entities. The computing platform may load, into the data entities, secure enterprise data. After loading the secure enterprise data into the data entities, the computing platform may activate a verification process associated with each data entity, which may include triggering each data entity to send verification messages to other data entities. Each data entity may be configured to receive and validate verification messages received from the other data entities of the plurality of data entities, and may be configured to delete secure enterprise data stored in the corresponding data entity upon failing to receive the verification messages from the other data entities.

20 Claims, 13 Drawing Sheets

(56) References Cited

U.S. PATENT DOCUMENTS

| | | |
|---|---|---|
| 10,721,248 B2 | 7/2020 | Lancioni et al. |
| 10,721,262 B2 | 7/2020 | Zorlular et al. |
| 10,728,218 B2 | 7/2020 | Lancioni et al. |
| 10,728,262 B1 | 7/2020 | Vaswani et al. |
| 10,728,263 B1 | 7/2020 | Neumann |
| 10,728,266 B2 | 7/2020 | Chailytko |
| 2008/0129488 A1* | 6/2008 | Hill .................. G06Q 10/08 340/539.13 |

* cited by examiner

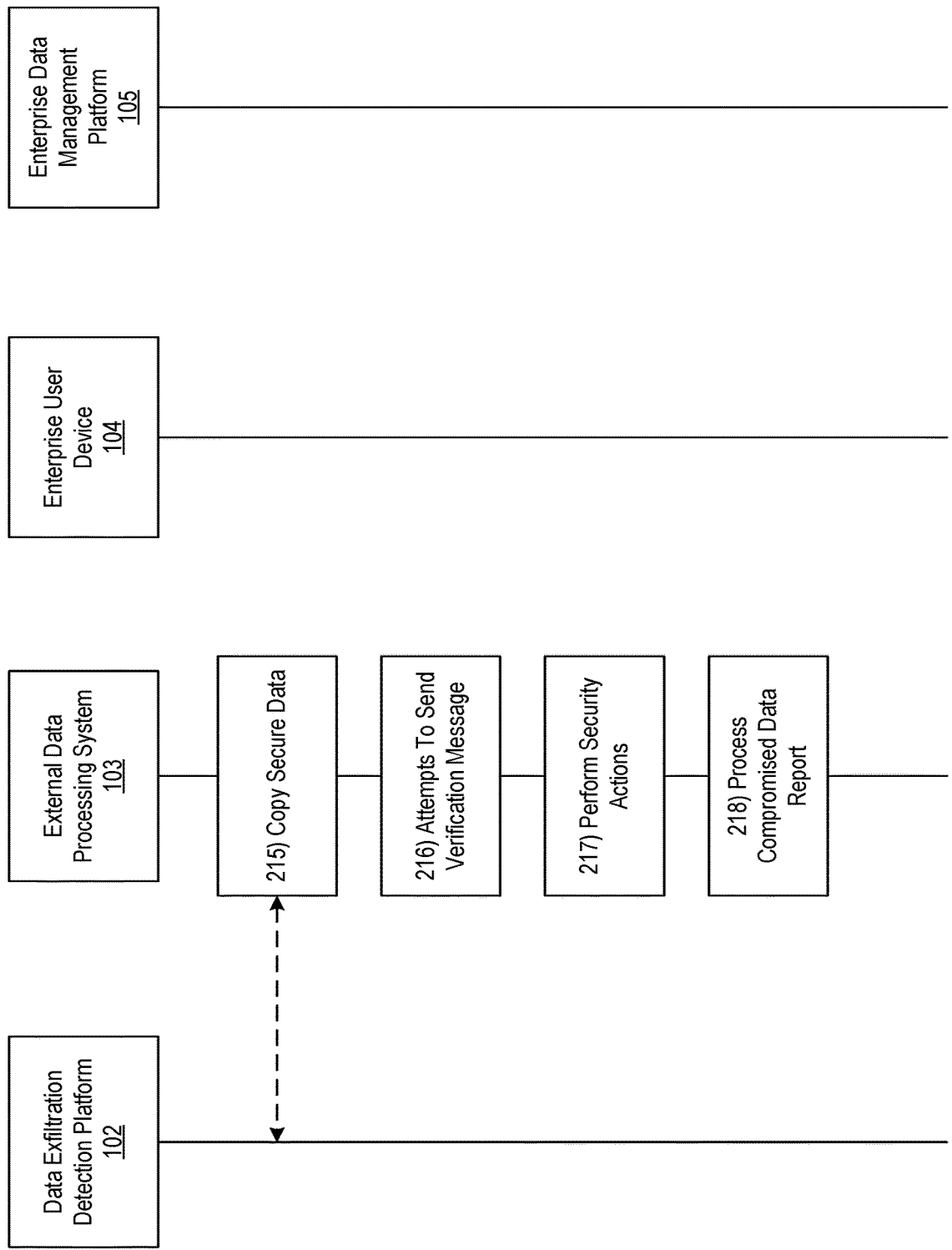

405

Enterprise Computing Interface

No data breaches have been detected.

Enterprise Computing Interface

"First Dataset" has been copied to an external data source without authorization. This data has been removed from the external data source. Additional precautions should be taken to protect "First Dataset."

FIG. 5

RESILIENT SELF-DETECTION OF MALICIOUS EXFILTRATION OF SENSITIVE DATA

BACKGROUND

Aspects of the disclosure relate to ensuring information security, preventing unauthorized access to secure information systems, and preventing enterprise data exfiltration. In particular, one or more aspects of the disclosure relate to computing platforms that enable and respond to detection of data exfiltration events.

In some cases, enterprise organizations may maintain or otherwise store confidential enterprise data, and may implement intrusion detection and prevention systems, or otherwise monitor network services to maintain data security. Such security measures may be useful in mitigating harm once data has been copied or otherwise exfiltrated, but may be unable to prevent damage caused by the exfiltration of the data itself. Furthermore, in some instances, malicious actors may compromise these security measures, which may result in enterprise organizations being unaware of a data exfiltration event. Accordingly, enterprise organizations may be vulnerable to data breaches and consequential damage resulting from data exfiltration.

SUMMARY

Aspects of the disclosure provide effective, efficient, scalable, and convenient technical solutions that address and overcome the technical problems associated with detecting and responding to data exfiltration events. For example, some aspects of the disclosure provide techniques that may enable data entities (which may, e.g., operate as logical objects that store and/or otherwise contain enterprise data) to detect whether they have been exfiltrated (e.g., removed from a secure enterprise computing environment) and, if so, to self-destruct before the enterprise data which they contain can be used by a malicious actor. For example, one or more computing devices may configure the data entities to communicate with each other to confirm their location within a secure enterprise computing environment (e.g., based on geographic proximity, network proximity, or the like). If the data entities do not receive confirmation communications from other linked data entities and/or if unanticipated proximity (e.g., an unexpected computing environment or other location) is detected, the data entities may determine that they have been exfiltrated and automatically perform mitigating actions accordingly.

One or more of the methods, systems, and other aspects of the disclosure provide various technical advantages. For example, although some security methods may prevent further damage once exfiltrated data has been identified, they might not mitigate damage caused by the exfiltrated data (e.g., because whatever data that was successfully exfiltrated may still be exploited by a malicious actor). This problem may be addressed by enabling data containers to self-destruct upon detection of exfiltration, as described in greater detail below, which may prevent malicious actors from exploiting any exfiltrated data. Another technical advantage provided by one or more aspects of the disclosure is that the systems and methods described herein are resilient because they do not depend on a centralized mechanism of exfiltration detection, which itself could be compromised and thus result in a failure to detect a data exfiltration event. Thus, using one or more aspects of the disclosure, detecting data exfiltration events may be performed with increased accuracy and vigilance.

In accordance with one or more embodiments of the disclosure, a data exfiltration detection platform comprising at least one processor, a communication interface, and memory storing computer-readable instructions may receive secure enterprise data from an enterprise data management platform. In response to receiving the secure enterprise data, the data exfiltration detection platform may generate a plurality of data entities, each comprising a data exfiltration detection and mitigation module. The data exfiltration detection platform may load, into the plurality of data entities, secure enterprise data. After loading the secure enterprise data into the plurality of data entities, the data exfiltration detection platform may activate, in each data entity of the plurality of data entities, a verification process associated with the data exfiltration detection and mitigation module of each data entity, which may include triggering the data exfiltration detection and mitigation module of each data entity to send verification messages to the data exfiltration detection and mitigation modules of the other data entities of the plurality of data entities. In some instances, the data exfiltration detection and mitigation module of each data entity may be configured to receive and validate verification messages received from the other data entities of the plurality of data entities, and to delete secure enterprise data stored in the corresponding data entity upon failing to receive the verification messages from the other data entities. The data exfiltration detection platform may send a confirmation message to the enterprise data management platform indicating that the data is being securely maintained.

In one or more instances, an external data processing system including at least one second processor, a second communication interface, and second memory storing second computer-readable instructions may copy a portion of the secure enterprise data, which may cause: 1) a corresponding data entity of the plurality of data entities to be copied along with the portion of the secure enterprise data, 2) the corresponding data entity to attempt to send, based on the verification process, a verification message to the data exfiltration detection and mitigation modules of the other data entities of the plurality of data entities, and 3) the corresponding data entity to delete the portion of the secure enterprise data after determining that the attempt to send the verification message to the data exfiltration detection and mitigation modules of the other data entities of the plurality of data entities was unsuccessful.

In one or more instances, copying the portion of the secure enterprise data by the external data processing system may further cause the corresponding data entity to identify a communication channel between the external data processing system and the data exfiltration detection platform, and the external data processing system may be configured to send a compromised data report, generated by the corresponding data entity, to the data exfiltration detection platform.

In one or more instances, the external data processing system may be located outside of a firewall configured to prevent unauthorized access to the data exfiltration detection platform. In one or more instances, attempting to send the verification message to the data exfiltration detection and mitigation modules of the other data entities of the plurality of data entities may include attempting to send the verification message a plurality of times. In these instances, deleting the portion of the secure enterprise data may include deleting the portion of the secure enterprise data, after attempting to send the verification message to the data exfiltration detection and mitigation modules of the other data entities of the plurality of data entities more than a predetermined threshold number of attempts, wherein the plurality of times is greater than the predetermined threshold number of attempts.

In one or more instances, each of the plurality of data entities may have a unique 256-bit hex identifier. In one or more instances, activating the verification process associated with the data exfiltration detection and mitigation module of each data entity may further include triggering the data exfiltration detection and mitigation module of each data entity to detect a geographic location of the data exfiltration detection and mitigation modules of the other data entities of the plurality of data entities. In these instances, the data exfiltration detection and mitigation module of each data entity may be further configured to receive and validate the geographic location detected for the other data entities of the plurality of data entities. In these instances, the data exfiltration detection and mitigation module of each data entity may be further configured to delete secure enterprise data stored in the corresponding data entity upon determining that a geographic location of the corresponding data entity is different than the geographic locations detected for the other data entities.

In one or more instances, activating the verification process associated with the data exfiltration detection and mitigation module of each data entity may further include triggering the data exfiltration detection and mitigation module of each data entity to identify a proximity measurement between each data entity and the data exfiltration detection and mitigation modules of the other data entities of the plurality of data entities. In these instances, the data exfiltration detection and mitigation module of each data entity may be further configured to compare the proximity measurements to a predetermined proximity threshold. In these instances, the data exfiltration detection and mitigation module of each data entity may be further configured to delete secure enterprise data stored in the corresponding data entity upon determining that the proximity measurements exceed the predetermined proximity threshold.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for implementing self-detection of malicious data exfiltration in accordance with one or more example embodiments;

FIGS. 4 and 5 depict illustrative graphical user interfaces for implementing self-detection of malicious data exfiltration in accordance with one or more example embodiments.

DETAILED DESCRIPTION

Figure 1A:
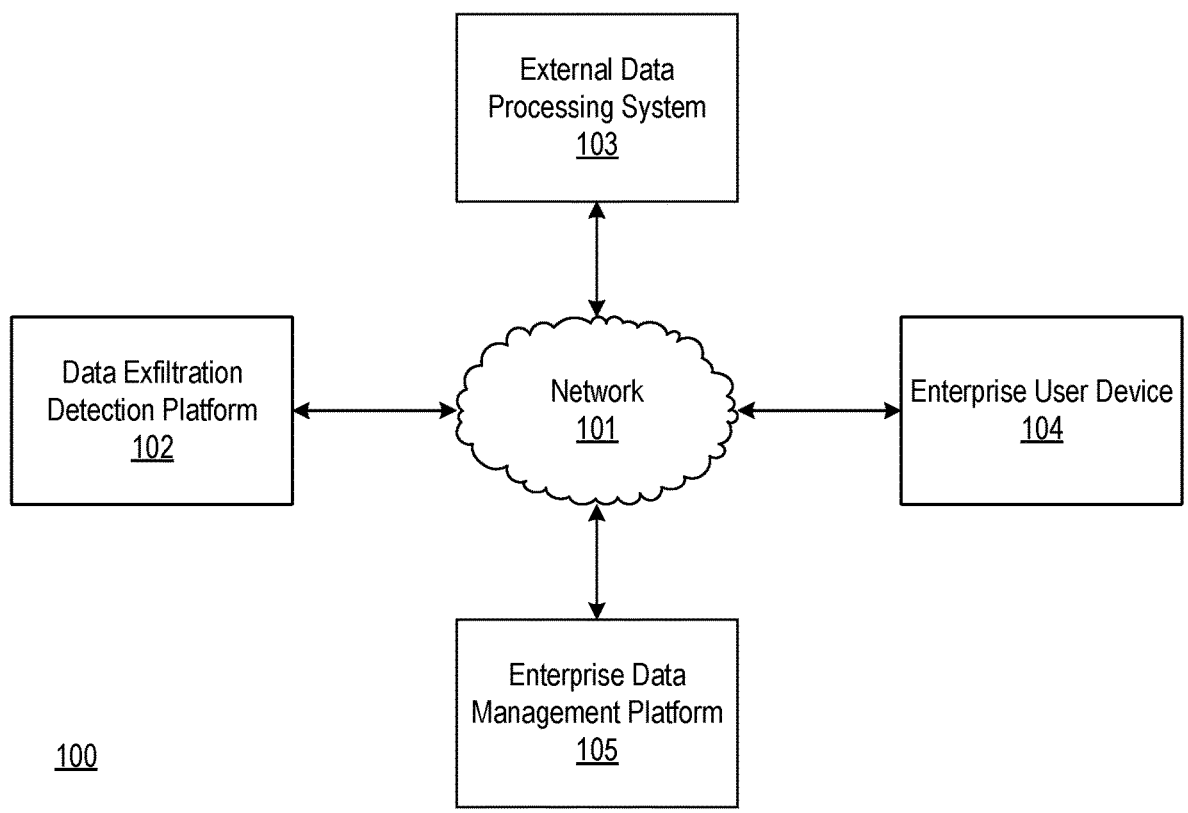
FIGS. 1A-1B depict an illustrative computing environment for implementing self-detection of malicious data exfiltration in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe a data centric access control system, which may include one or more data exfiltration detection and mitigation modules. In some instances, these data exfiltration detection and mitigation modules may exist behind a firewall (e.g., of an enterprise organization). These data exfiltration detection and mitigation modules may be configured to perform proximity detection and verification using network connectivity among several data entities behind the firewall. Accordingly, a data entity that has been exfiltrated may self-detect that it has been compromised because it may be unable to communicate with any other entities, which may result in protection of sensitive data that has been copied or otherwise removed from an internal enterprise network.

More specifically, data exfiltration, extrusion, exportation, or the like may occur when malware and/or a malicious actor carries out an unauthorized data transfer from internal computing systems of an individual or an organization. In recent years, a number of data exfiltration events have been reported and have damaged various organizations and governments.

Often, an organization may attempt to mitigate data exfiltration by implementing intrusion detection and prevention systems and regularly monitoring network services to ensure that only known acceptable services are running at any given time. If suspicious network services are running, they may be investigated, and appropriate measures may be taken immediately. Preventative measures may include implementation and maintenance of access controls, deception techniques, encryption of data in process/transit/at rest, or the like. Investigative measures may include various forensics actions and counter intelligence operations.

In some instances, data exfiltration may be prevented by way of anomaly detection of network activities. For example, if the volume of data leaving a network is unusually high for the time period and the location, network traffic may flag it as a warning and the system administrator may then take mitigating actions such as preventing network traffic to stop any further damage, and to identify/assess the damage that took place.

Although the above described method may stop further damage, it might not mitigate the damage that has already occurred. Another weakness of such a system is in case a malicious intruder infiltrates and compromises the above detection mechanism, the system might not be able to detect any form of data exfiltration happening. Accordingly, systems and methods for resilient self-detection of malicious exfiltration of sensitive data by the data entity itself and actions thereafter, as described in greater detail herein, may be used to address some of these deficiencies. For example, a method may be implemented where a data entity may detect whether it has been exfiltrated and if so, may self-destruct before it may be used by any malicious outsiders. This is a resilient method because it does not depend on a centralized mechanism of exfiltration detection and therefore may be difficult to compromise.

As illustrated in greater detail below, one or more aspects of the disclosure may be implemented within a framework of a data-centric security system. Traditional security measures such as firewalls, virtual private networks, access control, password protections, fraud prevention systems, or the like may be applied around hardware such as computers, servers, systems, information technology infrastructure, software applications, or the like. In these instances, however, if the security framework is ever compromised, a large amount of data may be exposed and vulnerable.

In data centric security, the security infrastructure may be applied around the data itself. Such security may be applied at several levels of granularity (e.g., around a database containing several data tables, around each table, around each individual data element, or the like).

Figure 6:
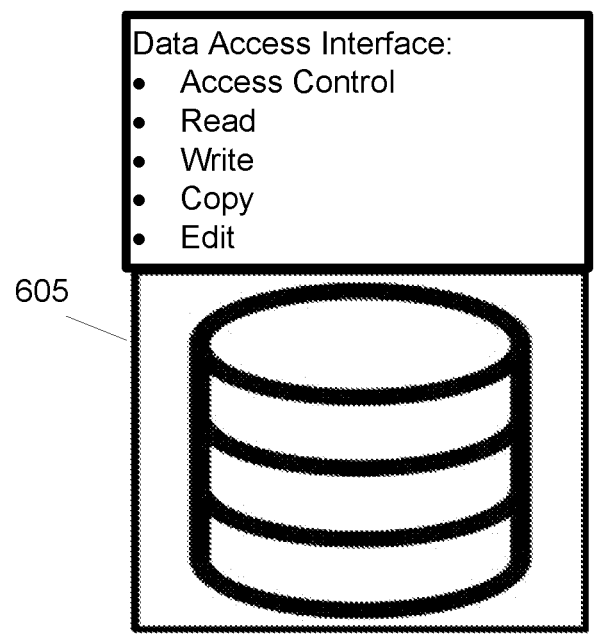
FIGS. 6-10 depict illustrative system diagrams for implementing self-detection of malicious data exfiltration in accordance with one or more example embodiments.

As shown in FIG. 6, a data centric security system 605 may protect data such as a database containing several data tables, individual data tables, individual data elements, or the like. The system may provide a data access interface for the protected data entity with access control and other applications providing functions such as read, write, copy, edit, delete, or the like.

Figure 7:
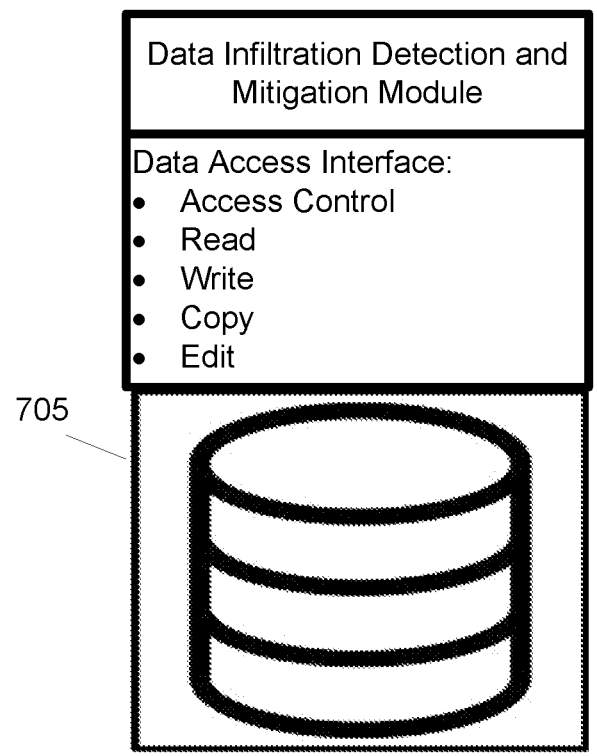

As shown in FIG. 7, the system of FIG. 6 may be enhanced to provide a whole system of protected data along with its access module and data exfiltration detection and mitigation module 705. In some instances, the data exfiltration detection and mitigation module may have several modules such as a data communication module (which may, e.g., communicate with other similar modules using communication networks), data exfiltration detection module, data exfiltration mitigation module, or the like.

Figure 8:
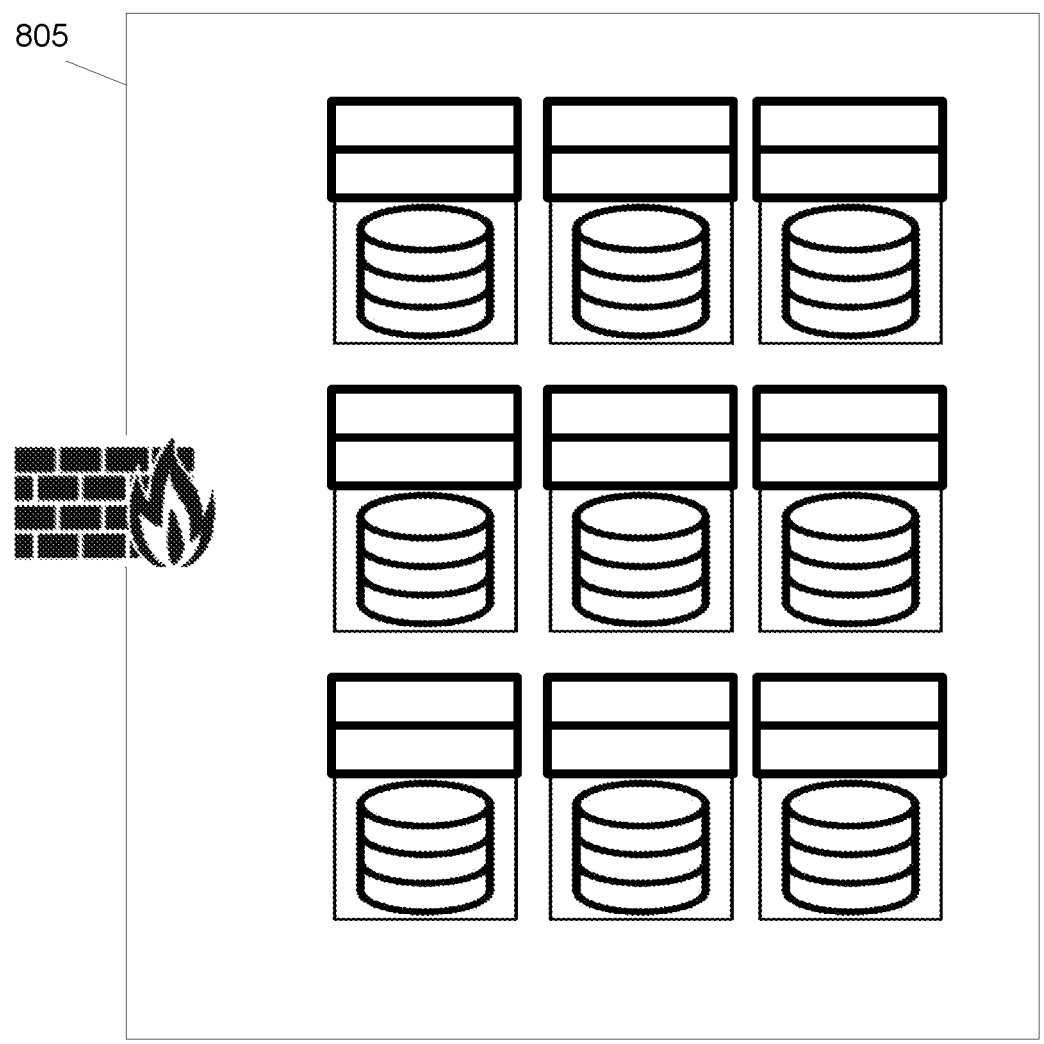

As shown in FIG. 8, several of these data entities may be deployed within a system 805 such as a data server, or within a whole organization. Each data entity may include a unique identifier that may be used to identify itself and other entities. In some instances, the identifier may be encrypted using 256 HEX encryption for complete uniqueness.

Figure 9:
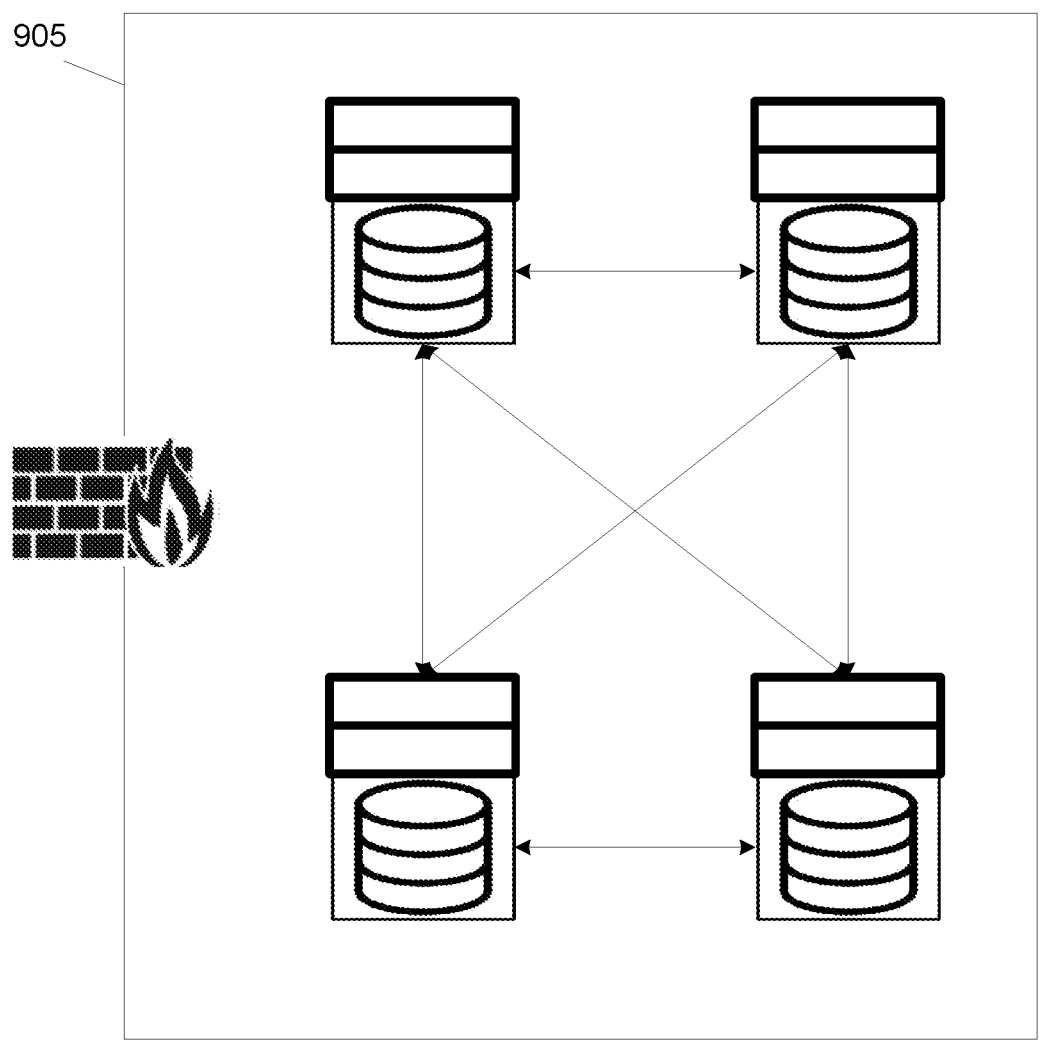

As shown in FIG. 9, within system 905, a data communication module may communicate with other data entities for determining the proximity of other modules within the system. The proximity may be geographic proximity such as within the same hardware, or network proximity, which may be determined by a network handshake (e.g., each system counts a number of hops or actual time before it receives a response from other data entities).

The data exfiltration detection module may create a list of all the data entities it is close to by counting the proximity distances to other data entities. In some instances, the data entities may broadcast a signal at regular intervals so that all the data entities may be aware of the proximity to all other data entities.

In some instances, if a new data entity is created and put into the system, it may send an introduction validation signal to all other entities so that all other data entities may recognize the data entity as a valid entity. In these instances, the introductory signal may be created by a higher authority such as a system administrator.

Figure 10:
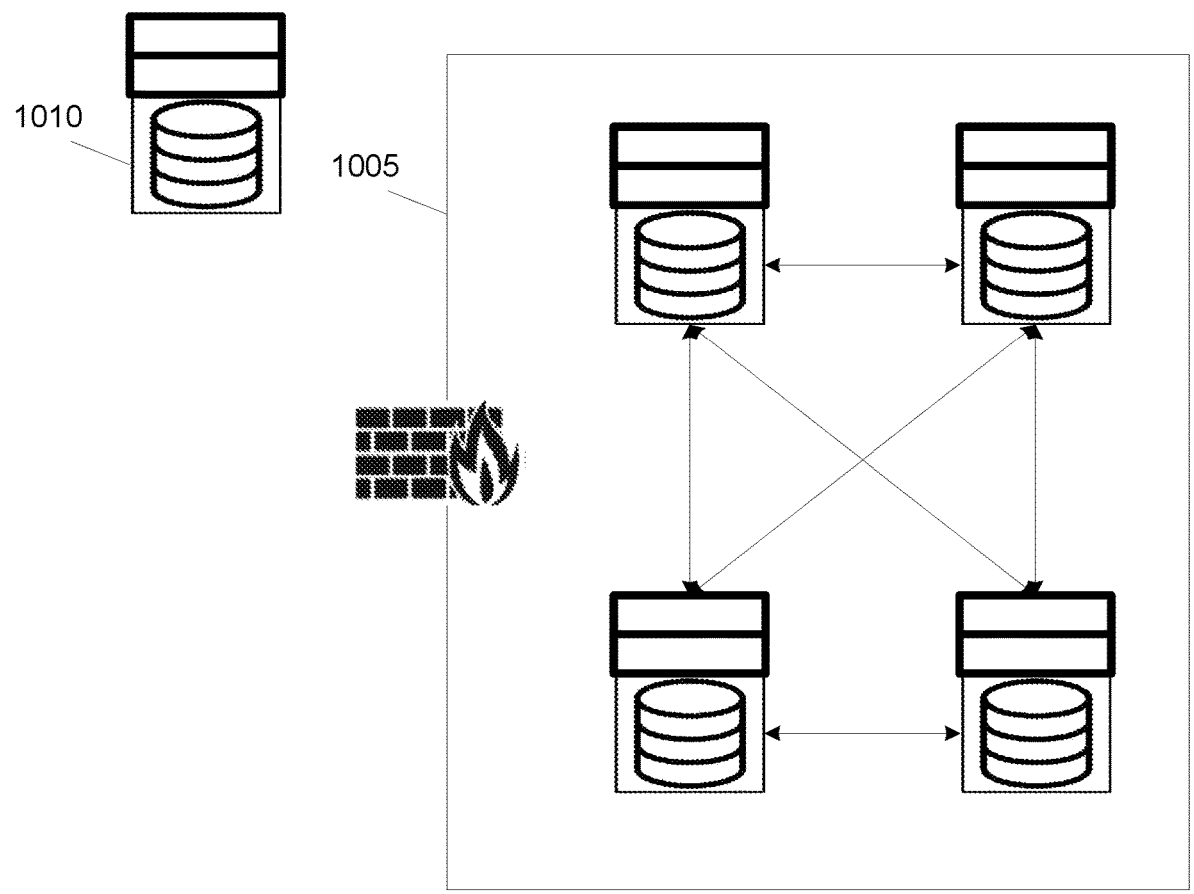

As shown in FIG. 10, where a data entity 1010 has been exfiltrated and moved out of a system 1005, the data exfiltration detection module of the corresponding data entity may attempt to discover all the data entities it is close to, and might not be able to find any or all of the anticipated data entities. Accordingly, the data exfiltration detection module may identify that the data entity is not in a regular/safe location, and may destroy or scramble the data within the data entity so that it may not be used by any malicious outsiders. This approach to exfiltration detection may be resilient because it does not depend on a centralized mechanism of exfiltration detection, and thus may be difficult to compromise.

Figure 1B:
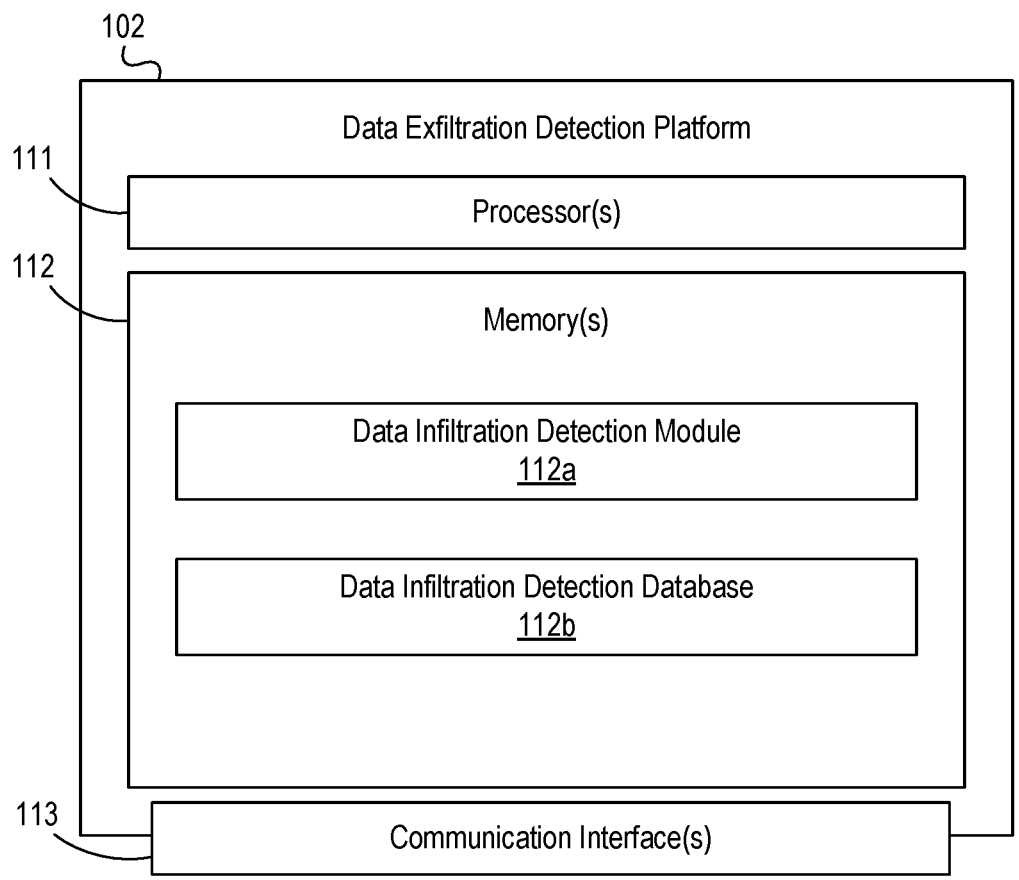

FIGS. 1A-1B depict an illustrative computing environment that implements self-detection of malicious data exfiltration in accordance with one or more example embodiments. Referring to FIG. 1A, computing environment 100 may include one or more computer systems. For example, computing environment 100 may include a data exfiltration detection platform 102, an external data processing system 103, an enterprise user device 104, and enterprise data management platform 105.

As described further below, data exfiltration detection platform 102 may be a computer system that includes one or more computing devices (e.g., servers, server blades, or the like) and/or other computer components (e.g., processors, memories, communication interfaces) that may be used to host and maintain one or more data entities (which may, e.g., be used for data storage). In some instances, these data entities may be configured to communicate with each other for data verification. In some instances, the data exfiltration detection platform 102 may be protected from external entities by a firewall.

External data processing system 103 may include one or more computing devices and/or other computer components (e.g., processors, memories, communication interfaces). In addition, external data processing system 103 may be operated by a malicious entity, and may be used to copy or otherwise exfiltrate data from the data exfiltration detection platform 102. In some instances, the external data processing system 103 may be located outside of the firewall used to protect the data exfiltration detection platform 102.

Enterprise user device 104 may be a mobile device, tablet, smartphone, or the like that may be used by an individual such as an employee of an enterprise organization (e.g., a financial institution, or the like). For example, the enterprise user device 104 may be used by one or more individuals to perform network security monitoring, or the like, and to provide indications of vulnerabilities, compromised data, or the like. In some instances, enterprise user device 104 may be configured to display one or more user interfaces (e.g., network security interfaces, or the like).

Enterprise data management platform 105 may include one or more computing devices and/or other computer components (e.g., processors, memories, communication interfaces). In addition, the enterprise data management platform 105 may be configured to store or otherwise host enterprise data, and to communicate with the data exfiltration detection platform 102 to enhance security of the enterprise data (e.g., using the monitoring and self-detection of data entities as described below).

Computing environment 100 also may include one or more networks, which may interconnect data exfiltration detection platform 102, external data processing system 103, enterprise user device 104, enterprise data management platform 105, or the like. For example, computing environment 100 may include a network 101 (which may interconnect, e.g., data exfiltration detection platform 102, external data processing system 103, enterprise user device 104, enterprise data management platform 105, or the like).

In one or more arrangements, data exfiltration detection platform 102, external data processing system 103, enterprise user device 104, and/or enterprise data management platform 105 may be any type of computing device capable of sending and/or receiving requests and processing the requests accordingly. For example, data exfiltration detection platform 102, external data processing system 103, enterprise user device 104, enterprise data management platform 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of data exfiltration detection platform 102, external data processing system 103, enterprise user device 104, and/or enterprise data management platform 105, may, in some instances, be special-purpose computing devices configured to perform specific functions.

Referring to FIG. 1B, data exfiltration detection platform 102 may include one or more processors 111, memory 112, and communication interface 113. A data bus may interconnect processor 111, memory 112, and communication interface 113. Communication interface 113 may be a network interface configured to support communication between data exfiltration detection platform 102 and one or more networks (e.g., network 101, or the like). Memory 112 may include one or more program modules having instructions that when executed by processor 111 cause data exfiltration detection platform 102 to perform one or more functions described herein and/or one or more databases that may store and/or otherwise maintain information which may be used by such program modules and/or processor 111. In some instances, the one or more program modules and/or databases may be stored by and/or maintained in different memory units of data exfiltration detection platform 102 and/or by different computing devices that may form and/or otherwise make up data exfiltration detection platform 102. For example, memory 112 may have, host, store, and/or include data exfiltration detection module 112a and a data exfiltration detection database 112b.

Data exfiltration detection module 112a may have instructions that direct and/or cause data exfiltration detection platform 102 to execute advanced machine learning techniques to provide one or more exfiltration detection functions, such as detection of malicious exfiltration of sensitive data as discussed in greater detail below. Data exfiltration detection database 112b may store information used by data exfiltration detection module 112a and/or data exfiltration detection platform 102 in application of advanced techniques to provide one or more exfiltration detection functions, and/or in performing other functions.

Figure 2A:
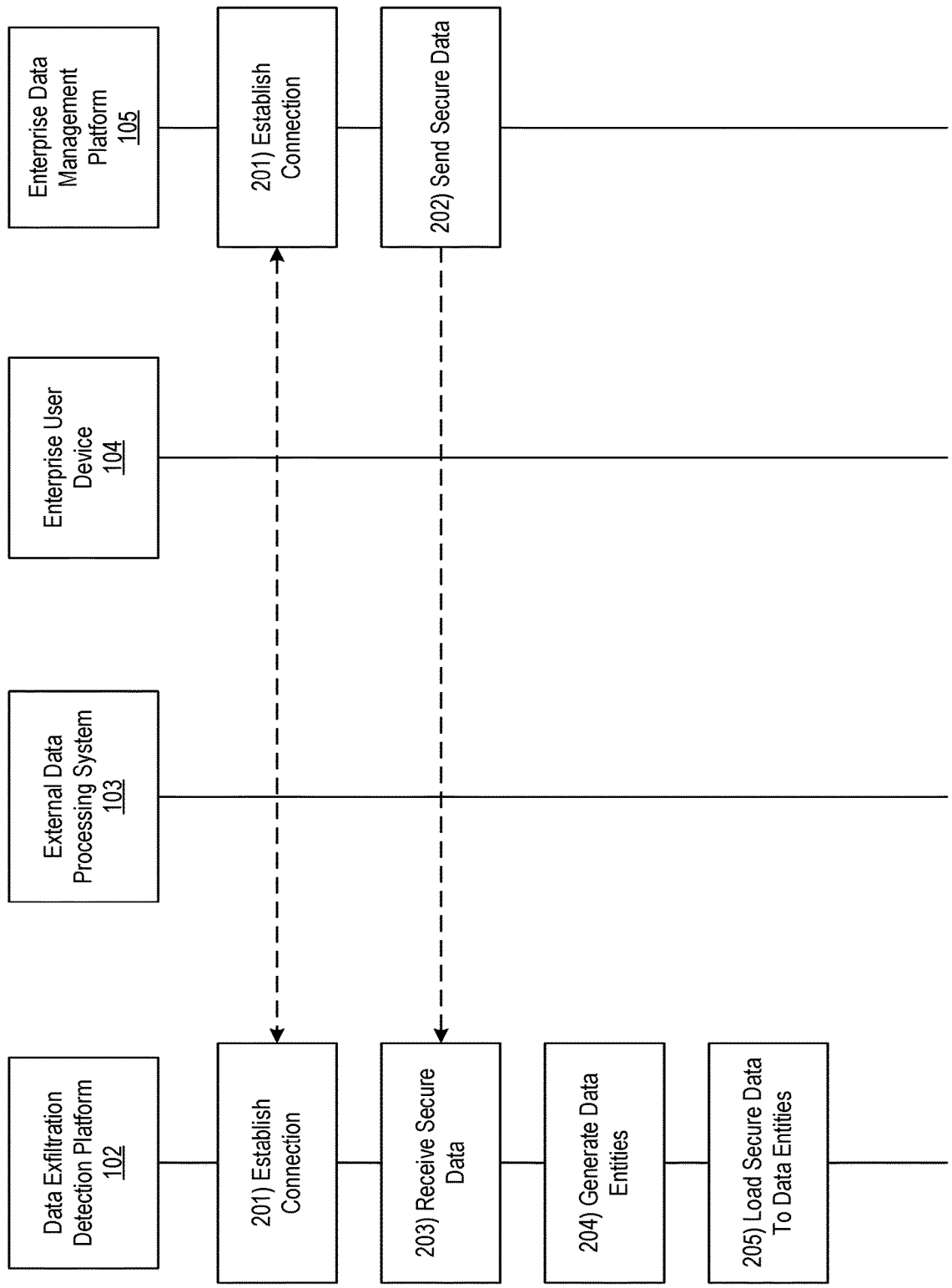

FIGS. 2A-2E depict an illustrative event sequence for resilient self-detection of malicious exfiltration of sensitive data in accordance with one or more example embodiments. Referring to FIG. 2A, at step 201, the enterprise data management platform 105 may establish a connection with data exfiltration detection platform 102. For example, enterprise data management platform 105 may establish a first wireless data connection with data exfiltration detection platform 102 to link the enterprise data management platform 105 with the data exfiltration detection platform 102 (e.g., in preparation for sending secure data). In some instances, the enterprise data management platform 105 may identify whether or not a connection is already established with the data exfiltration detection platform 102. If a connection is already established, the enterprise data management platform 105 might not re-establish the connection. If a connection is not yet established, the enterprise data management platform 105 may establish the first wireless data connection as described herein.

At step 202, the enterprise data management platform 105 may send enterprise data to the data exfiltration detection platform 102 to further secure the enterprise data. For example, in sending the enterprise data to the data exfiltration detection platform 102, the enterprise data management platform 105 may send account records, transaction data, customer information, or the like. In some instances, the enterprise data management platform 105 may send the enterprise data to the data exfiltration detection platform 102 while the first wireless data connection is established.

At step 203, the data exfiltration detection platform 102 may receive the enterprise data sent at step 202. For example, the data exfiltration detection platform 102 may receive the secure data via the communication interface and while the first wireless data connection is established.

Although the sending and receiving of data is illustrated and described at steps 202 and 203, this is for illustrative purposes, and the sending and receiving of such data may be continually performed (e.g., in real time, at periodic intervals, or the like) throughout the described event sequence without departing from the scope of the disclosure described herein.

At step 204, the data exfiltration detection platform 102 may generate data entities similar to the data entities shown in FIG. 7. For example, the data exfiltration detection platform 102 may generate a plurality of data containers, which may, e.g., form a data centric security system, that may include data exfiltration detection and mitigation modules (e.g., as shown in FIG. 7) configured to communicate with other data entities, detect data exfiltration, mitigate data exfiltration, and/or perform other functions. In some instances, the data entities may further be configured to provide access control and may be configured with other applications that may provide additional functionality such as read, write, copy, edit, delete, and/or other functions. In some instances, in generating the data entities, the data exfiltration detection platform 102 may generate a unique identifier for each data entity that may be used by the data entities to identify each other. For example, the data exfiltration detection platform 102 may encrypt the identifier using a 256 HEX encryption system, which may result in unique identifiers for each data entity. In some instances, the data exfiltration detection platform 102 may generate the data entities based on or in response to receiving the enterprise data at step 203.

At step 205, the data exfiltration detection platform 102 may load the enterprise data (e.g., received at step 203) into the data entities generated at step 204. In some instances, in loading the enterprise data into the data entities, the data exfiltration detection platform 102 may load several data tables, a single data table, a single data column, a single data row, a single data element, or the like into the data entities. In doing so, the data exfiltration detection platform 102 may protect the enterprise data using data centric security, which may result in increased data security (e.g., even if a particular data entity is breached or stolen, the remaining data entities might not be compromised).

Figure 2B:
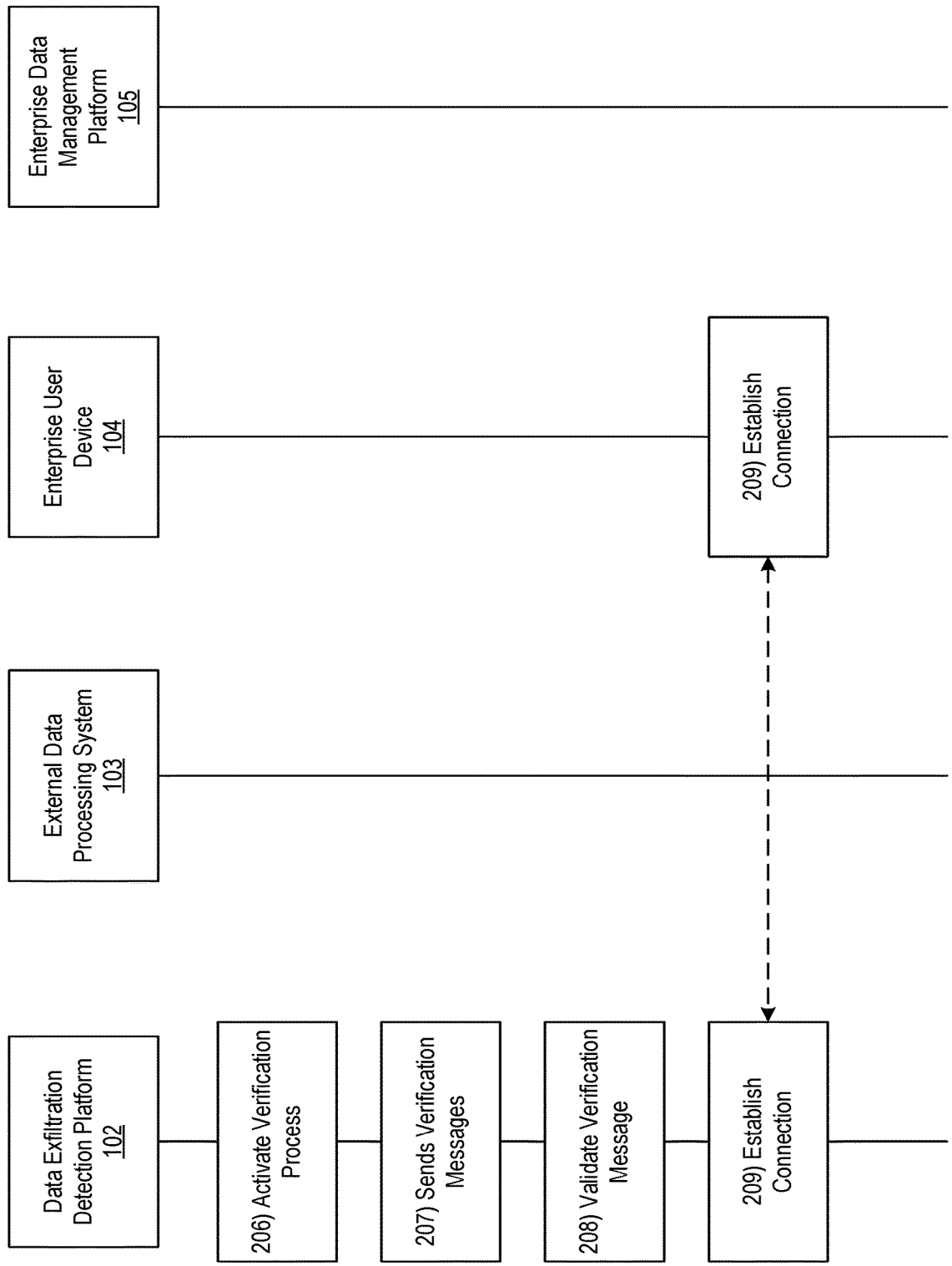

Referring to FIG. 2B, at step 206, the data exfiltration detection platform 102 may activate a verification process for the data entities. For example, in activating the verification process for the data entities, the data exfiltration detection platform 102 may enable the data entities to communicate with each other as illustrated in FIG. 9. For example, the data entities may be configured to communicate with each other to identify proximity of other modules within data exfiltration detection platform 102. In some instances, the data exfiltration detection platform 102 may activate the verification process after loading the enterprise data into the data entities.

At step 207, the data exfiltration detection platform 102 may cause the data entities to communicate with each other based on activation of the verification process (e.g., the data exfiltration detection platform 102 may host or otherwise process the communications). For example, activation of the verification process may trigger the data exfiltration detection and mitigation modules of the data entities to send verification messages to the data exfiltration detection and mitigation modules of remaining data entities. For example, the data entities may communicate with each other to identify proximity of other modules within data exfiltration detection platform 102. In some instances, the data entities may broadcast signals at a predetermined interval to alert each other of their proximities to each other. For example, the data entities may detect geographic locations of each other, and may verify their own location based on detection on a geographic location that is common to the remaining data entities as well. Additionally or alternatively, the data entities may identify network proximity measurements between themselves and remaining data entities, and may verify their location based on a determination that the proximity measurements do not exceed a predetermined proximity threshold.

As data entities are initially generated or otherwise added to the data exfiltration detection platform 102, the data entities may send an introduction validation signal to the remaining data entities. In doing so, the data entities may allow other data entities to recognize each other as valid entities. In some instances, this introduction validation signal may be generated by a system administrator, or the like, and broadcast between the data entities.

At step 208, the data exfiltration detection platform 102 may cause the data entities to validate (e.g., using the data exfiltration detection and mitigation modules of each data entity) the communications between each other (e.g., both introduction validation signals and the ongoing communications). For example, the data exfiltration detection platform 102 may host or otherwise process this validation of communications. In some instances, the data entities may identify geographic proximity (e.g., within the same hardware), network proximity (e.g., based on network handshakes counting a number of hops, amount of time, or the like before a response is received), or the like, and may compare the identified proximity to one or more predetermined thresholds. In some instances, if a data entity determines that an identified proximity is greater than the one or more predetermined thresholds, it may determine that one or both of the data entities corresponding to the identified proximity has been exfiltrated. In contrast, if the data entity determines that the identified proximity is less than the one or more predetermined thresholds, it may determine that one or both of the data entities are in a secure location. In some instances, the data entities may generate a list of nearby data entities based on the identified proximities.

In some instances, the data entities may apply one or more quorums or thresholds to determine whether or not they have been exfiltrated. For example, if the data entities are unable to communicate with more than 80% (or some other predetermined percentage) of the remaining data entities, they may determine that they have been exfiltrated. Similarly, if the data entities are able to communicate with more than 80% (or some other predetermined percentage) of the remaining data entities, they may determine that they have not been exfiltrated. Additionally or alternatively, if the data entities determine that more than a predetermined percentage of responses indicate that the remaining data entities are outside of a proximity (e.g., geographic, network, or the like) threshold, the data entities may determine that they have been exfiltrated, whereas they may determine that they have not been exfiltrated if less than the predetermined percentage of responses indicate that the remaining data entities are outside of the proximity threshold (e.g., if a single one or the remaining data entities is marginally outside of the threshold, or the like). Additionally or alternatively, if the data entities receive responses from more than one (or some other threshold number) unrecognized data entity, they may determine that they have been exfiltrated, whereas if the data entities do not receive responses from more than one (or some other threshold number) unrecognized data entity, they may determine that they have not been exfiltrated. In doing so, the data entities may minimize and/or prevent identification of false positive/negative determinations that they have been exfiltrated (e.g., because a single anticipated response was not received, or the like). For illustrative purposes, it is assumed that at step 208, the data exfiltration detection platform 102 did not identify any exfiltrated data entities.

At step 209, the data exfiltration detection platform 102 may establish a connection with enterprise user device 104. For example, the data exfiltration detection platform 102 may establish a second wireless data connection with the enterprise user device 104 to link the data exfiltration detection platform 102 to the enterprise user device 104 (e.g., in preparation for sending data validation confirmation messages). In some instances, the data exfiltration detection platform 102 may identify whether or not a connection is already established with the enterprise user device 104. If a connection is already established with the enterprise user device 104, the data exfiltration detection platform 102 might not re-establish the connection. If a connection is not yet established with the enterprise user device 104, the data exfiltration detection platform 102 may establish the second wireless data connection as described herein.

Figure 2C:
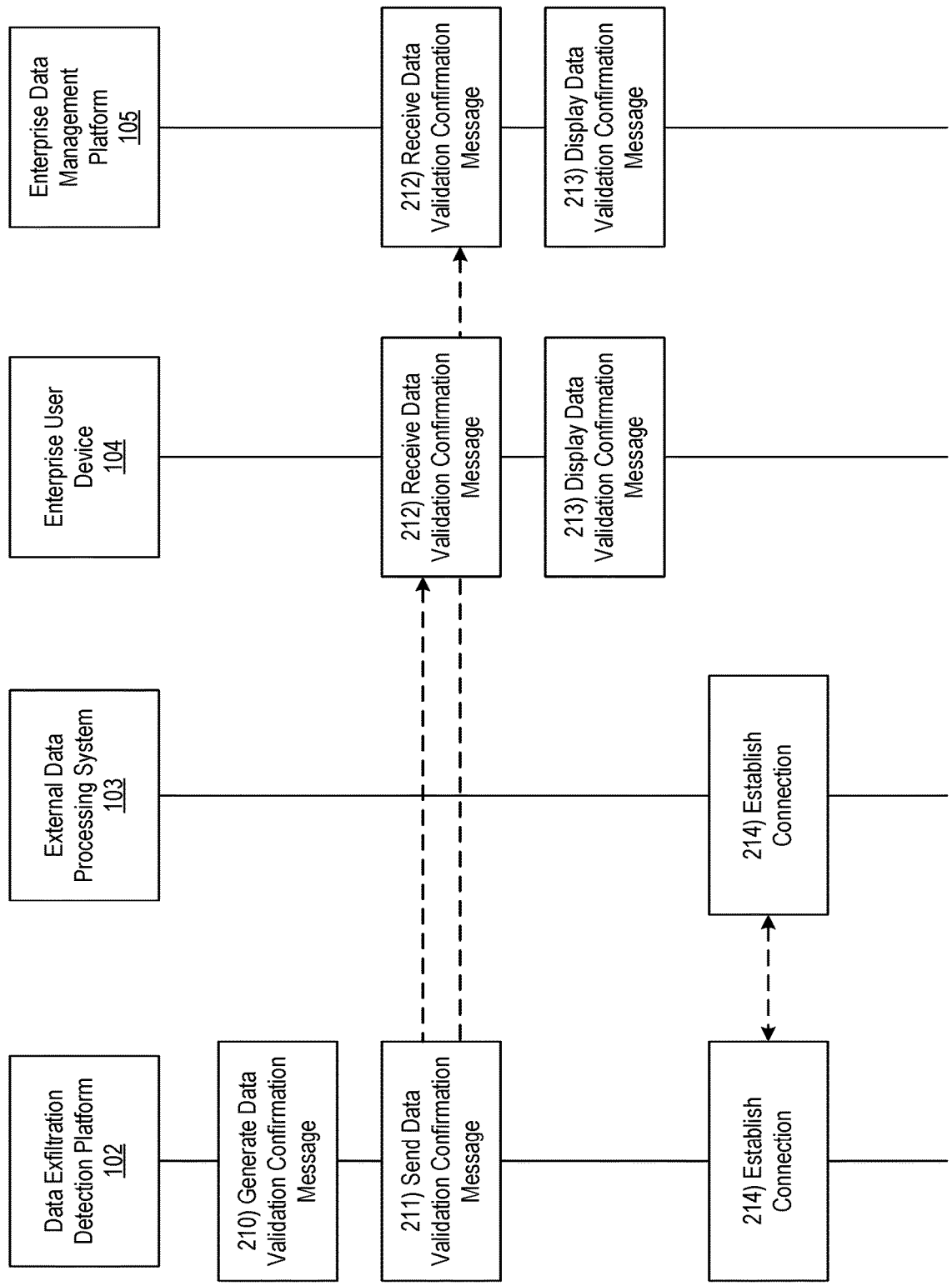

Referring to FIG. 2C, at step 210, the data exfiltration detection platform 102 may generate a data validation confirmation message. For example, the data exfiltration detection platform 102 may generate a data validation confirmation message indicating that the data entities did not identify any potentially exfiltrated data, and that the enterprise data stored at the data exfiltration detection platform 102 is secure.

At step 211, the data exfiltration detection platform 102 may send the data validation confirmation message, generated at step 210, to the enterprise user device 104 and/or the enterprise data management platform 105. For example, the data exfiltration detection platform 102 may send the data validation confirmation message to the enterprise user device 104 and/or the enterprise data management platform 105 via the communication interface 113 and while the first and/or second wireless data connections are respectively established. In some instances, the data exfiltration detection platform 102 may send, along with the data validation confirmation message, one or more commands directing the enterprise user device 104 and/or the enterprise data management platform 105 to display the data validation confirmation message.

At step 212, the enterprise user device 104 and/or the enterprise data management platform 105 may receive the data validation confirmation message sent at step 211. For example, the enterprise user device 104 and/or the enterprise data management platform 105 may receive the data validation confirmation message while the first and/or second wireless data connections are respectively established. In some instances, the enterprise user device 104 and/or the enterprise data management platform 105 may receive one or more commands directing the enterprise user device 104 and/or the enterprise data management platform 105 to display the validation confirmation message.

At step 213, the enterprise user device 104 and/or the enterprise data management platform 105 may display the data validation confirmation message. For example, the enterprise user device 104 and/or the enterprise data management platform 105 may display the data validation confirmation message based on or in response to the one or more commands directing the enterprise user device 104 and/or the enterprise data management platform 105 to display the data validation confirmation message. In some instances, in displaying the data validation confirmation message, the enterprise user device 104 and/or the enterprise data management platform 105 may display a graphical user interface similar to graphical user interface 405, indicating that no data breaches have been detected.

At step 214, the external data processing system 103 may establish a connection with the data exfiltration detection platform 102. For example, the external data processing system 103 may establish a third wireless data connection with the data exfiltration detection platform 102 (e.g., in preparation for copying data from the data exfiltration detection platform 102). In some instances, the external data processing system 103 may identify whether or not a connection is already established with the data exfiltration detection platform 102. If a connection is already established with the data exfiltration detection platform 102, the external data processing system 103 might not re-establish the connection. If a connection is not yet established with the data exfiltration detection platform 102, the data exfiltration detection platform 102 may establish the third wireless data connection as described herein.

Referring to FIG. 2D, at step 215, the external data processing system 103 may copy secure data from the data exfiltration detection platform 102. For example, the external data processing system 103 may breach a firewall protecting the data exfiltration detection platform 102, and may copy one or more data entities stored at the data exfiltration detection platform 102. In this example, the external data processing system 103 may create a data entity configuration similar to that shown in FIG. 10. In some instances, the external data processing system 103 may store the one or more copied data entities outside of the firewall protecting the data exfiltration detection platform 102.

At step 216, the one or more copied data entities may attempt to communicate with each other as described above at step 207 (e.g., based on the verification process activated at step 206). For example, the external data processing system 103 may host or otherwise process the communication attempts. In contrast to step 207, however, the one or more copied data entities may be unable to communicate with each other, as the one or more copied data entities may be physically separated from the remaining data entities (e.g., because the one or more copied data entities are now located outside of the network on which the remaining data entities reside). Additionally or alternatively, the one or more copied data entities may identify a proximity (e.g., geographic proximity, network proximity, or the like) that exceeds the one or more predetermined thresholds described above at step 208. Based on the lack of responses from the remaining data entities and/or the identified proximities that exceed the one or more predetermined thresholds, the one or more copied data entities may determine that they have been exfiltrated. In some instances, the one or more copied data entities may attempt to communicate with each other as a result of the copying performed at step 215.

In some instances, the one or more copied data entities may attempt to communicate with each other a plurality of times before determining that the communications were unsuccessful. For example, the one or more copied data entities may compare the plurality of times that communication has been attempted to a predetermined threshold number of attempts, and may determine that the communications were unsuccessful once the plurality of times exceeds the predetermined threshold number of attempts.

In addition or as an alternative to determining that responses from the remaining data entities were not received, the one or more copied data entities may receive a response from unrecognized data entities (e.g., data entities corresponding to the external data processing system 103). In these instances, one or more copied data entities may determine, based on the response from unrecognized data entities, that they have been exfiltrated.

In some instances, the one or more copied data entities may apply one or more quorums or thresholds to determine whether or not they have been exfiltrated. For example, if the one or more copied data entities are unable to communicate with more than 80% (or some other predetermined percentage) of the remaining data entities, they may determine that they have been exfiltrated. Similarly, if the one or more copied data entities are able to communicate with more than 80% (or some other predetermined percentage) of the remaining data entities, they may determine that they have not been exfiltrated. Additionally or alternatively, if the one or more copied data entities determine that more than a predetermined percentage of responses indicate that the remaining data entities are outside of a proximity (e.g., geographic, network, or the like) threshold, the one or more copied data entities may determine that they have been exfiltrated, whereas they may determine that they have not been exfiltrated if less than the predetermined percentage of responses indicate that the remaining data entities are outside of the proximity threshold (e.g., a single one or the remaining data entities is marginally outside of the threshold, or the like). Additionally or alternatively, if the one or more copied data entities receive responses from more than one (or some other threshold number) unrecognized data entity, they may determine that they have been exfiltrated, whereas if the one or more copied data entities do not receive responses from more than one (or some other threshold number) unrecognized data entity, they may determine that they have not been exfiltrated. In doing so, the one or more copied data entities may minimize and/or prevent identification of false positive/negative determinations that they have been exfiltrated (e.g., because a single anticipated response was not received, or the like).

At step 217, based on or in response to the determination at step 217 that the one or more copied data entities have been exfiltrated, the one or more copied data entities may perform one or more security actions (e.g., the external data processing system 103 may host or otherwise process the one or more security actions). For example, the one or more copied data entities may self-destruct, delete the corresponding enterprise data, scramble the corresponding enterprise data, otherwise make the corresponding enterprise data unusable by the external data processing system 103, or the like. In doing so, the one or more copied data entities may prevent unauthorized access or use of the corresponding enterprise data by the external data processing system 103. In some instances, the one or more copied data entities may perform the one or more security actions as a result of the copying performed at step 215.

At step 218, the external data processing system 103 may process a compromised data report based on the security actions performed at step 217. For example, the one or more copied data entities may generate a report identifying the one or more copied data entities, indicating that they have been compromised, indicating what security actions have been performed, or the like.

Figure 2E:
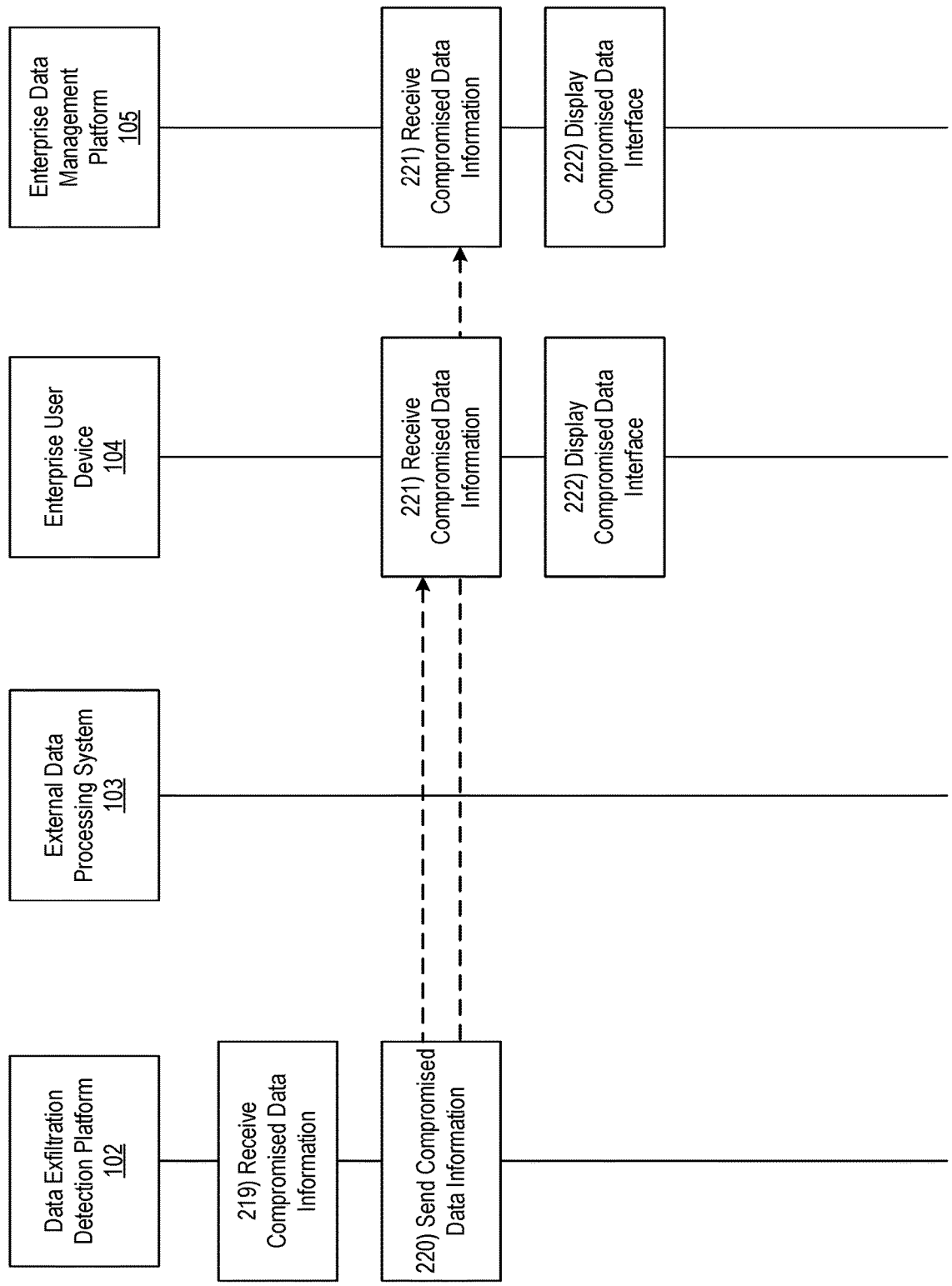

Referring to FIG. 2E, at step 219, the data exfiltration detection platform 102 may receive comprised data information. For example, the data exfiltration detection platform 102 may receive compromised data information from the external data processing system 103 (e.g., as initiated by the one or more copied data entities) based on the compromised data report. In some instances, the compromised data report may be sent to the data exfiltration detection platform 102 from the external data processing system 103. In these instances, the one or more copied data entities may identify a communication channel between the external data processing system 103 and the data exfiltration detection platform 102 (e.g., the third wireless data connection), and may send the compromised data information to the data exfiltration detection platform 102 while the identified communication channel is established. In some instances, the data exfiltration detection platform 102 may receive the compromised data report itself from the external data processing system 103.

At step 220, the data exfiltration detection platform 102 may send the compromised data information to the enterprise user device 104 and/or the enterprise data management platform 105. In some instances, the data exfiltration detection platform 102 may send the compromised data information to the enterprise user device 104 and/or the enterprise data management platform 105 while the first and/or second wireless data connections are established and via the communication interface 113. In some instances, along with the compromised data information, the data exfiltration detection platform 102 may send one or more commands directing the enterprise user device 104 and/or the enterprise data management platform 105 to display a compromised data interface based on the compromised data information.

At step 221, the enterprise user device 104 and/or enterprise data management platform 105 may receive the compromised data information sent at step 220. For example, the enterprise user device 104 and/or enterprise data management platform 105 may receive the compromised data information while the first and/or second wireless data connections are respectively established. In some instances, the enterprise user device 104 and/or enterprise data management platform 105 may receive one or more commands directing the enterprise user device 104 and/or the enterprise data management platform 105 to display a compromised data interface based on the compromised data information.

At step 222, the enterprise user device 104 and/or enterprise data management platform 105 may display a compromised data interface (e.g., based on or in response to the one or more commands directing the enterprise user device 104 and/or the enterprise data management platform 105 to display a compromised data interface). For example, the enterprise user device 104 and/or enterprise data management platform 105 may display a graphical user interface similar to graphical user interface 505, which is shown in FIG. 5. For example, the enterprise user device 104 and/or enterprise data management platform 105 may indicate enterprise data that has been copied (e.g., using the unique identifier for the one or more copied data entities) and/or indicating the security actions taken to protect the copied enterprise data.

Figure 3:
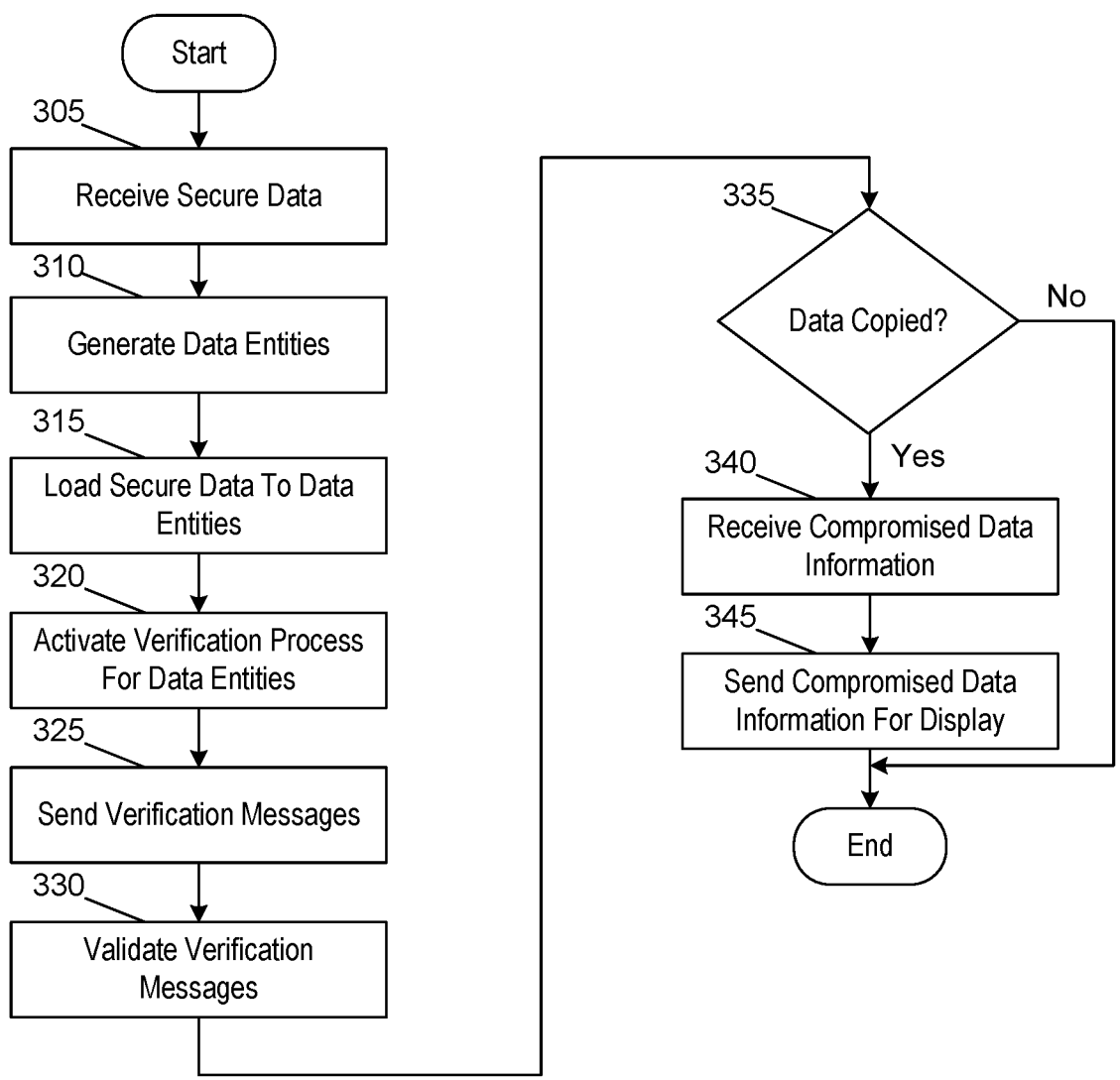
FIG. 3 depicts an illustrative method for implementing self-detection of malicious data exfiltration in accordance with one or more example embodiments.

FIG. 3 depicts an illustrative method for resilient self-detection of malicious exfiltration of sensitive data in accordance with one or more example embodiments. Referring to FIG. 3, at step 305, a computing platform having at least one processor, a communication interface, and memory may receive enterprise data from an enterprise data management platform. At step 310, the computing platform may generate one or more data entities to store the enterprise data. At step 315, the computing platform may load the secure data into the data entities. At step 320, the computing platform may activate a verification process for the data entities. At step 325, the computing platform may cause the data entities to send verification messages to each other. At step 330, the computing platform may cause the data entities to validate the verification messages. If data is copied at step 335, the computing platform may proceed to step 340. If data is not copied, the method may end.

At step 340, the computing platform may receive compromised data information from an external data processing system. At step 345, the computing platform may send compromised data information and one or more commands directing an enterprise user device and/or an enterprise data management platform 105 to display a compromised data interface based on the compromised data information.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system, comprising:
    a data exfiltration detection platform comprising:
        at least one processor;
        a communication interface communicatively coupled to the at least one processor; and
        memory storing computer-readable instructions that, when executed by the at least one processor, cause the data exfiltration detection platform to:
            receive secure enterprise data from an enterprise data management platform;
            in response to receiving the secure enterprise data, generate a plurality of data entities, wherein each data entity of the plurality of data entities comprises a data exfiltration detection and mitigation module;
            load, into the plurality of data entities, secure enterprise data, wherein each portion of the loaded secure enterprise data corresponding to one of the plurality of data entities, which can communicate with other data entities of the plurality of data entities;
            after loading the secure enterprise data into the plurality of data entities, activate, in each data entity of the plurality of data entities, a verification process associated with the data exfiltration detection and mitigation module of each data entity,
            wherein activating the verification process associated with the data exfiltration detection and mitigation module of each data entity comprises triggering the data exfiltration detection and mitigation module of each data entity to send verification messages to the data exfiltration detection and mitigation modules of the other data entities of the plurality of data entities,
            wherein the data exfiltration detection and mitigation module of each data entity is configured to receive and validate verification messages received from the other data entities of the plurality of data entities, and
            wherein the data exfiltration detection and mitigation module of each data entity is configured to delete secure enterprise data stored in the corresponding data entity upon failing to receive the verification messages from the other data entities; and
        send a confirmation message to the enterprise data management platform indicating that the data is being securely maintained.

2. The system of claim 1, comprising:
    an external data processing system comprising:
        at least one second processor;
        a second communication interface communicatively coupled to the at least one second processor; and
        second memory storing computer-readable instructions that, when executed by the at least one second processor, cause the external data processing system to:
            copy a portion of the secure enterprise data, wherein copying the portion of the secure enterprise data causes:
                a corresponding data entity of the plurality of data entities to be copied along with the portion of the secure enterprise data,
                the corresponding data entity to attempt to send, based on the verification process, a verification message to the data exfiltration detection and mitigation modules of the other data entities of the plurality of data entities, and
                the corresponding data entity to delete the portion of the secure enterprise data after determining that the attempt to send the verification message to the data exfiltration detection and mitigation modules of the other data entities of the plurality of data entities was unsuccessful.

3. The system of claim 2, wherein copying the portion of the secure enterprise data causes by the external data processing system further causes the corresponding data entity to identify a communication channel between the external data processing system and the data exfiltration detection platform, wherein the external data processing system is configured to send a compromised data report, generated by the corresponding data entity, to the data exfiltration detection platform.

4. The system of claim 2, wherein the external data processing system is located outside of a firewall configured to prevent unauthorized access to the data exfiltration detection platform.

5. The system of claim 2, wherein:
    attempting to send the verification message to the data exfiltration detection and mitigation modules of the other data entities of the plurality of data entities comprises attempting to send the verification message a plurality of times; and deleting the portion of the secure enterprise data comprises deleting, after attempting to send the verification message to the data exfiltration detection and mitigation modules of the other data entities of the plurality of data entities more than a predetermined threshold number of attempts, wherein the plurality of times is greater than the predetermined threshold number of attempts.

6. The system of claim 1, wherein each of the plurality of data entities has a unique 256-bit hex identifier.

7. The system of claim 1, wherein:
activating the verification process associated with the data exfiltration detection and mitigation module of each data entity further comprises triggering the data exfiltration detection and mitigation module of each data entity to detect a geographic location of the data exfiltration detection and mitigation modules of the other data entities of the plurality of data entities;
the data exfiltration detection and mitigation module of each data entity is further configured to receive and validate the geographic location detected for the other data entities of the plurality of data entities; and
the data exfiltration detection and mitigation module of each data entity is further configured to delete secure enterprise data stored in the corresponding data entity upon determining that a geographic location of the corresponding data entity is different than the geographic locations detected for the other data entities.

8. The system of claim 1, wherein:
activating the verification process associated with the data exfiltration detection and mitigation module of each data entity further comprises triggering the data exfiltration detection and mitigation module of each data entity to identify a proximity measurement between each data entity and the data exfiltration detection and mitigation modules of the other data entities of the plurality of data entities;
the data exfiltration detection and mitigation module of each data entity is further configured to compare the proximity measurements to a predetermined proximity threshold; and
the data exfiltration detection and mitigation module of each data entity is further configured to delete secure enterprise data stored in the corresponding data entity upon determining that the proximity measurements exceed the predetermined proximity threshold.

9. A method comprising:
at a data exfiltration detection platform comprising at least one processor, a communication interface, and memory:
receiving secure enterprise data from an enterprise data management platform;
in response to receiving the secure enterprise data, generating a plurality of data entities, wherein each data entity of the plurality of data entities comprises a data exfiltration detection and mitigation module;
loading, into the plurality of data entities, secure enterprise data, wherein each portion of the loaded secure enterprise data corresponding to one of the plurality of data entities, which can communicate with other data entities of the plurality of data entities;
after loading the secure enterprise data into the plurality of data entities, activating, in each data entity of the plurality of data entities, a verification process associated with a data exfiltration detection and mitigation module of each data entity,
wherein activating the verification process associated with the data exfiltration detection and mitigation module of each data entity comprises triggering the data exfiltration detection and mitigation module of each data entity to send verification messages to the data exfiltration detection and mitigation modules of the other data entities of the plurality of data entities,
wherein the data exfiltration detection and mitigation module of each data entity is configured to receive and validate verification messages received from the other data entities of the plurality of data entities, and
wherein the data exfiltration detection and mitigation module of each data entity is configured to delete secure enterprise data stored in the corresponding data entity upon failing to receive the verification messages from the other data entities; and
sending a confirmation message to the enterprise data management platform indicating that the data is being securely maintained.

10. The method of claim 9, further comprising:
at an external data processing system comprising at least one second processor, a second communication interface, and second memory:
copying a portion of the secure enterprise data, wherein copying the portion of the secure enterprise data causes:
a corresponding data entity of the plurality of data entities to be copied along with the portion of the secure enterprise data,
the corresponding data entity to attempt to send, based on the verification process, a verification message to the data exfiltration detection and mitigation modules of the other data entities of the plurality of data entities, and
the corresponding data entity to delete the portion of the secure enterprise data after determining that the attempt to send the verification message to the data exfiltration detection and mitigation modules of the other data entities of the plurality of data entities was unsuccessful.

11. The method of claim 10, wherein copying the portion of the secure enterprise data causes by the external data processing system further causes the corresponding data entity to identify a communication channel between the external data processing system and the data exfiltration detection platform, wherein the external data processing system is configured to send a compromised data report, generated by the corresponding data entity, to the data exfiltration detection platform.

12. The method of claim 10, wherein the external data processing system is located outside of a firewall configured to prevent unauthorized access to the data exfiltration detection platform.

13. The method of claim 10, wherein:
attempting to send the verification message to the data exfiltration detection and mitigation modules of the other data entities of the plurality of data entities comprises attempting to send the verification message a plurality of times; and
deleting the portion of the secure enterprise data comprises deleting, after attempting to send the verification message to the data exfiltration detection and mitigation modules of the other data entities of the plurality of data entities more than a predetermined threshold number of attempts, wherein the plurality of times is greater than the predetermined threshold number of attempts.

14. The method of claim 9, wherein each of the plurality of data entities has a unique 256-bit hex identifier.

15. The method of claim 9, wherein:
activating the verification process associated with the data exfiltration detection and mitigation module of each data entity further comprises triggering the data exfiltration detection and mitigation module of each data entity to detect a geographic location of the data exfiltration detection and mitigation modules of the other data entities of the plurality of data entities;
the data exfiltration detection and mitigation module of each data entity is further configured to receive and validate the geographic location detected for the other data entities of the plurality of data entities; and
the data exfiltration detection and mitigation module of each data entity is further configured to delete secure enterprise data stored in the corresponding data entity upon determining that a geographic location of the corresponding data entity is different than the geographic locations detected for the other data entities.

16. The method of claim 9, wherein:
activating the verification process associated with the data exfiltration detection and mitigation module of each data entity further comprises triggering the data exfiltration detection and mitigation module of each data entity to identify a proximity measurement between each data entity and the data exfiltration detection and mitigation modules of the other data entities of the plurality of data entities;
the data exfiltration detection and mitigation module of each data entity is further configured to compare the proximity measurements to a predetermined proximity threshold; and
the data exfiltration detection and mitigation module of each data entity is further configured to delete secure enterprise data stored in the corresponding data entity upon determining that the proximity measurements exceed the predetermined proximity threshold.

17. One or more non-transitory computer-readable media storing instructions that, when executed by a data exfiltration detection platform comprising at least one processor, a communication interface, and memory, cause the data exfiltration detection platform to:
receive secure enterprise data from an enterprise data management platform;
in response to receiving the secure enterprise data, generate a plurality of data entities, wherein each data entity of the plurality of data entities comprises a data exfiltration detection and mitigation module;
load, into the plurality of data entities, secure enterprise data, wherein each portion of the loaded secure enterprise data corresponding to one of the plurality of data entities, which can communicate with other data entities of the plurality of data entities;
after loading the secure enterprise data into the plurality of data entities, activate, in each data entity of the plurality of data entities, a verification process associated with the data exfiltration detection and mitigation module of each data entity,
wherein activating the verification process associated with the data exfiltration detection and mitigation module of each data entity comprises triggering the data exfiltration detection and mitigation module of each data entity to send verification messages to the data exfiltration detection and mitigation modules of the other data entities of the plurality of data entities,
wherein the data exfiltration detection and mitigation module of each data entity is configured to receive and validate verification messages received from the other data entities of the plurality of data entities, and
wherein the data exfiltration detection and mitigation module of each data entity is configured to delete secure enterprise data stored in the corresponding data entity upon failing to receive the verification messages from the other data entities; and
send a confirmation message to the enterprise data management platform indicating that the data is being securely maintained.

18. The one or more non-transitory computer-readable media of claim 17, wherein the instructions, when executed by an external data processing system comprising at least one second processor, a second communication interface, and second memory, cause the external data processing system to:
copy a portion of the secure enterprise data, wherein copying the portion of the secure enterprise data causes:
a corresponding data entity of the plurality of data entities to be copied along with the portion of the secure enterprise data,
the corresponding data entity to attempt to send, based on the verification process, a verification message to the data exfiltration detection and mitigation modules of the other data entities of the plurality of data entities, and
the corresponding data entity to delete the portion of the secure enterprise data after determining that the attempt to send the verification message to the data exfiltration detection and mitigation modules of the other data entities of the plurality of data entities was unsuccessful.

19. The one or more non-transitory computer-readable media of claim 18, wherein copying the portion of the secure enterprise data causes by the external data processing system further causes the corresponding data entity to identify a communication channel between the external data processing system and the data exfiltration detection platform, wherein the external data processing system is configured to send a compromised data report, generated by the corresponding data entity, to the data exfiltration detection platform.

20. The one or more non-transitory computer-readable media of claim 18, wherein the external data processing system is located outside of a firewall configured to prevent unauthorized access to the data exfiltration detection platform.

* * * * *